US012770998B2

(12) United States Patent
Chae et al.

(10) Patent No.: US 12,770,998 B2
(45) Date of Patent: Oct. 20, 2026

(54) SECONDARY BATTERY

(71) Applicant: LG Energy Solution, Ltd., Seoul (KR)

(72) Inventors: Oh Byong Chae, Daejeon (KR); Ye Ri Kim, Daejeon (KR); Su Yeon Lee, Daejeon (KR); Seo Young Jeon, Daejeon (KR); Seung Hae Hwang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 933 days.

(21) Appl. No.: 17/785,289

(22) PCT Filed: Jan. 11, 2021

(86) PCT No.: PCT/KR2021/000345
§ 371 (c)(1),
(2) Date: Jun. 14, 2022

(87) PCT Pub. No.: WO2021/145623
PCT Pub. Date: Jul. 22, 2021

(65) Prior Publication Data
US 2023/0013715 A1 Jan. 19, 2023

(30) Foreign Application Priority Data
Jan. 15, 2020 (KR) ........................ 10-2020-0005637

(51) Int. Cl.
*H01M 50/682* (2021.01)
*H01M 50/103* (2021.01)

(52) U.S. Cl.
CPC ....... *H01M 50/682* (2021.01); *H01M 50/103* (2021.01)

(58) Field of Classification Search
None
See application file for complete search history.

(56) References Cited

U.S. PATENT DOCUMENTS

2006/0099494 A1* 5/2006 Jung ..................... H01M 50/15 429/174
2013/0236792 A1 9/2013 Terado
(Continued)

FOREIGN PATENT DOCUMENTS

CN 1855327 A 11/2006
CN 103155259 A 6/2013
(Continued)

OTHER PUBLICATIONS

KR20160032482A Machine Translation (Year: 2016).*
(Continued)

*Primary Examiner* — Niki Bakhtiari
(74) *Attorney, Agent, or Firm* — Lerner David LLP

(57) ABSTRACT

The present invention relates to a secondary battery. The secondary battery according to the present invention may include an electrode assembly, an electrolyte, and a battery case configured to accommodate the electrode assembly and the electrolyte. The battery case may include a main body having accommodation space in which the electrode assembly and the electrolyte are accommodated, an additional electrolyte accommodation part having a storage space in which an additional electrolyte is accommodated, a connection part configured to form a moving passage through which the additional electrolyte is supplied from the addition electrolyte accommodation part to the main body, and an electrolyte impregnation member provided on the connection part and impregnated with the additional electrolyte.

11 Claims, 8 Drawing Sheets

(56) References Cited

U.S. PATENT DOCUMENTS

| | | | |
|---|---|---|---|
| 2014/0154554 | A1 | 6/2014 | Kim et al. |
| 2014/0170469 | A1 | 6/2014 | Terado |
| 2015/0037663 | A1 | 2/2015 | Uhm et al. |
| 2016/0141565 | A1 * | 5/2016 | Uhm et al. |
| 2018/0159112 | A1 | 6/2018 | Chung et al. |

FOREIGN PATENT DOCUMENTS

| | | | | |
|---|---|---|---|---|
| CN | 105229823 | A | | 1/2016 |
| CN | 109860444 | A | | 6/2019 |
| JP | 2000-268877 | A | | 9/2000 |
| JP | 2006303224 | A | * | 11/2006 |
| JP | 2008-159315 | A | | 7/2008 |
| JP | 2012124150 | A | | 6/2012 |
| JP | 2013-178950 | A | | 9/2013 |
| JP | 2016-522546 | A | | 7/2016 |
| KR | 20130038655 | A | | 4/2013 |
| KR | 101327777 | B1 | | 11/2013 |
| KR | 20140015647 | A | | 2/2014 |
| KR | 20140068550 | A | | 6/2014 |
| KR | 101447313 | B1 | | 10/2014 |
| KR | 20150014637 | A | | 2/2015 |
| KR | 20150014893 | A | | 2/2015 |
| KR | 20160032482 | A | * | 3/2016 |
| KR | 20160048324 | A | | 5/2016 |
| KR | 101627357 | B1 | | 6/2016 |
| KR | 101651515 | B1 | | 8/2016 |
| KR | 20180062826 | A | | 6/2018 |
| KR | 20180082752 | A | * | 7/2018 |
| KR | 102099905 | B1 | | 4/2020 |
| TW | 201324928 | A | * | 6/2013 |
| WO | 2012035968 | A1 | | 3/2012 |
| WO | 2018-212121 | A1 | | 11/2018 |

OTHER PUBLICATIONS

KR20180082752A Machine Translation (Year: 2018).*

English Translation of Wang, TW-201324928-A (Year: 2013).*

Search Report dated Oct. 8, 2024 from the Office Action for Chinese Application No. 202180007942.0 Issued Oct. 9, 2024, pp. 1-2.

Extended European Search Report including Written Opinion for Application No. 21740682.6 dated Jul. 3, 2024. 8 pgs.

Search Report dated Jan. 11, 2024 from Office Action for Chinese Application No. 202180007942.0 issued Jan. 16, 2024. 3 pgs.

International Search Report for PCT/KR2021/000345 dated Apr. 26, 2021. 3 pgs.

* cited by examiner

SECONDARY BATTERY

CROSS-REFERENCE TO RELATED APPLICATIONS

The present application is a national phase entry under 35 U.S.C. § 371 of International Application No. PCT/KR2021/000345 filed on Jan. 11, 2021, which claims the benefit of the priority of Korean Patent Application No. 10-2020-0005637, filed on Jan. 15, 2020, all of which are hereby incorporated herein by reference in their entirety.

TECHNICAL FIELD

The present invention relates to a secondary battery.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. The secondary battery accommodates an electrode assembly and an electrolyte. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as a form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

Recently, the pouch-type battery in which a stack/folding type electrode assembly is built in a pouch-type battery case provided as an aluminum lamination sheet is attracting much attention due to its low manufacturing cost, small weight, easy shape deformation, and the like, and thus, its usage is gradually increasing.

However, as the secondary battery is used, there has been a problem that an electrolyte is gradually consumed to deteriorate performance. The electrolyte may be gasified as the secondary battery is repeatedly charged and discharged and be gradually consumed by being accumulated in the form of a polymer.

[Prior Art Document] (Patent Document) Korean Patent Publication No. 10-2014-0015647

DISCLOSURE OF THE INVENTION

Technical Problem

One aspect of the present invention is to provide a secondary battery that is capable of easily supplying an additional electrolyte to the secondary battery.

Technical Solution

A secondary battery according to an embodiment of the present invention comprises a secondary battery, which comprises an electrode assembly, an electrolyte, and a battery case configured to accommodate the electrode assembly and the electrolyte, wherein the battery case comprises: a main body having accommodation space in which the electrode assembly and the electrolyte are accommodated; an additional electrolyte accommodation part having a storage space in which an additional electrolyte is accommodated; a connection part configured to form a moving passage through which the additional electrolyte is supplied from the addition electrolyte accommodation part to the main body; and an electrolyte impregnation member provided on the connection part and impregnated with the additional electrolyte.

A battery pack according to an embodiment of the present invention comprises a battery pack comprising the secondary battery according to an embodiment of the present invention.

Advantageous Effects

According to the present invention, the additional electrolyte accommodation part in which the storage space for accommodating the additional electrolyte is formed may be provided in the secondary battery to easily supply the additional electrolyte and prevent the cycle performance from being deteriorated.

In addition, the electrolyte impregnation member that is impregnated with the additional electrolyte may be provided on the connection part through which the additional electrolyte is supplied to the main body in which the electrolyte is accommodated from the addition electrolyte accommodation part to more smoothly supply the additional electrolyte, thereby more effectively improving the performance.

MODE FOR CARRYING OUT THE INVENTION

Figure 1:
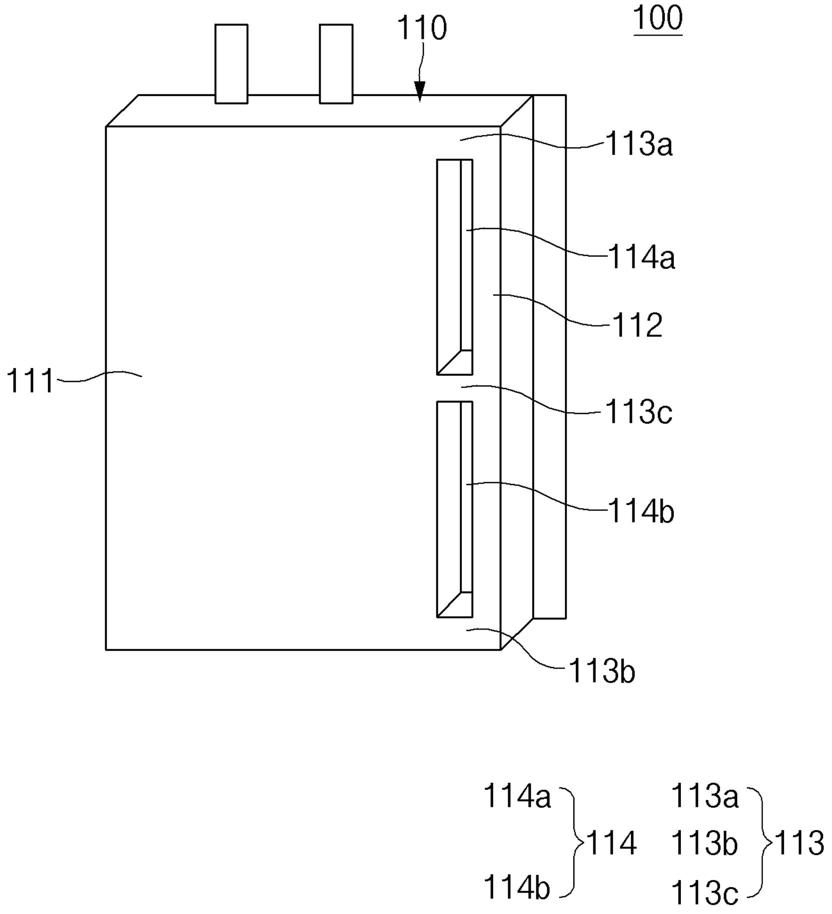
FIG. 1 is a perspective view of a secondary battery according to a first embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

First Embodiment

Figure 2:
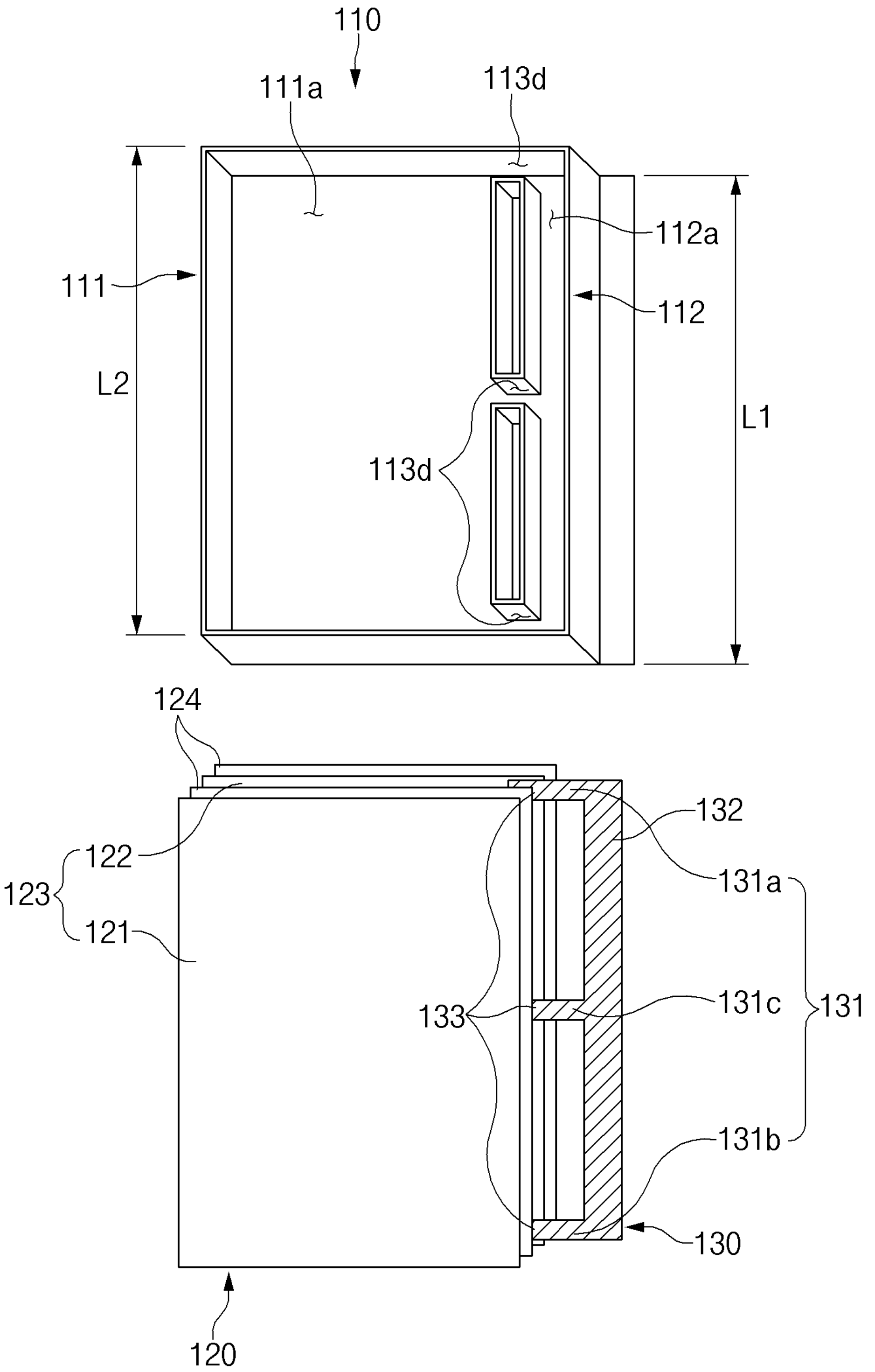
FIG. 2 is an exploded perspective view of the secondary battery of FIG. 1 with a removed portion.

FIG. 1 is a perspective view of a secondary battery according to a first embodiment of the present invention, and FIG. 2 is an exploded perspective view illustrating a state in which a portion of the secondary battery is removed according to the first embodiment of the present invention.

Referring to FIGS. 1 and 2, a secondary battery 100 according to a first embodiment of the present invention relates to a secondary battery 100 comprising an electrolyte and a battery case 110. The battery case 110 comprises a main body 111 in which the electrode assembly 120 and the electrolyte are accommodated, an additional electrolyte accommodation part 112 accommodating an additional electrolyte, a connection part 113 forming a moving passage 113*d* from the additional electrolyte accommodation part 112 to the main body 111, and an electrolyte impregnation member 130 provided in the connection part 113. In addition, the secondary battery 100 according to the first embodiment of the present invention may further comprise a sealing part 114.

In more detail, the secondary battery 100 according to the first embodiment of the present invention comprises the electrode assembly 120, the electrolyte, and the battery case 110 accommodating the electrode assembly 120 and the electrolyte.

The electrode assembly 120 may be a chargeable and dischargeable power generation element and may comprise electrodes 123 and separators 124, which are alternately stacked.

The electrodes 122 may comprise a positive electrode 121 and a negative electrode 122. Here, the electrode assembly 120 may have a structure in which the positive electrode 121/the separator 124/the negative electrode 122 are alternately laminated. Also, the electrode lead 30 may comprise a positive electrode lead connected to the positive electrode 121 and a negative electrode lead connected to the negative electrode 122.

The positive electrode 121 may comprise a positive electrode collector and a positive electrode active material stacked on the positive electrode collector.

The positive electrode collector may be made of an aluminum foil.

The positive electrode active material may comprise lithium manganese oxide, lithium cobalt oxide, lithium nickel oxide, lithium iron phosphate, or a compound or mixture containing at least one of the above-described materials.

The negative electrode 122 may comprise a negative electrode collector and a negative electrode active material stacked on the negative electrode collector.

The negative electrode collector may be made of, for example, a foil made of a copper (Cu) material.

The negative active material may be a compound or a mixture containing a graphite-based material.

The separator 124 is made of an insulation material to electrically insulate the positive electrode 121 from the negative electrode 122. Here, the separator 124 may be made of a polyolefin-based resin film such as polyethylene or polypropylene having micropores.

The battery case 110 may comprise the main body 111, the additional electrolyte accommodation part 112, the connection part 113, and the electrolyte impregnation member 130.

An accommodation space 111*a* in which the electrode assembly 120 and the electrolyte are accommodated may be formed in the main body 111.

A storage space 112*a* accommodating the additional electrolyte may be formed in the additional electrolyte accommodation part 112. Here, the additional electrolyte may be the same component as the electrolyte contained in the accommodation space 111*a* of the main body 111.

Also, the additional electrolyte accommodation part 112 may have the same length as the main body 111.

Furthermore, the additional electrolyte accommodation part 112 may be formed in a rectangular cylindrical shape with a hollow therein.

The connection part 113 may form the moving passage 113*d* through which the additional electrolyte is supplied from the additional electrolyte accommodation part 112 to the main body 111.

Also, the connection part 113 may have the same thickness as each of the main body 111 and the additional electrolyte accommodation part 112.

Furthermore, the connection part 113 may connect upper, lower, and central portions of the additional electrolyte accommodation part 112 to each other.

Here, the connection part 113 may comprise a first connection part 113*a* connecting the main body 111 to the uppermost side of the additional electrolyte accommodation part 112, a second connection part 113*b* connecting the main body 111 to the lowermost side of the additional electrolyte accommodation part 112, and a third connection part 113*c* connecting the main body to a central side of the additional electrolyte accommodation part 112.

Here, each of the first connection part 113*a*, the second connection part 113*b*, and the third connection part 113*c* may be formed in a rectangular cylindrical shape.

The electrolyte impregnation member 130 may be provided on the connection part 113 and may be impregnated with the additional electrolyte.

Thus, when an amount of electrolyte accommodated in the accommodation space 111*a* of the main body 111 is reduced, the electrolyte impregnation member 130 may induce the additional electrolyte disposed in the additional electrolyte accommodation part 112 so as to be supplied to the accommodation space 111*a* of the main body 111.

Also, one side part 132 of the electrolyte impregnation member 130 may further extend into the storage space 112*a* of the additional electrolyte accommodation part 112.

Also, the electrolyte impregnation member 130 may comprise at least one or more of a nonwoven fabric, a separation membrane, or a cloth. Here, the separation membrane used in the electrolyte impregnation member 130 may be made of the same material as the separator 124 used in the electrode assembly 120.

The electrolyte impregnation member 130 may comprise an impregnation part 131 disposed on the connection part, one side part 132 that further extends into the storage space 112*a* of the additional electrolyte accommodation part 112, and the other side part 133 of which an end further extends into the accommodation part of the main body 111.

Here, the other side part 133 of the electrolyte impregnation member 130 may have a size corresponding to a length and width of the accommodation space 111*a* of the additional electrolyte accommodation part 112. Here, the other side part 133 of the electrolyte impregnation member 130 may be formed in a rectangular plate shape having a predetermined width.

Furthermore, an end of the other side part 133 of the electrolyte impregnation member 130 may further extend into the accommodation space of the main body 111. Here, the end of the other side part 133 of the electrolyte impregnation member 130 may extend between the electrode 122 and the separator 124.

Also, the electrolyte impregnation member 130 may be formed in an "E" shape.

The impregnation part 131 may be formed to have a size corresponding to a length and width of the moving passage 113*d* of the connection part 113.

Also, the impregnation part 131 may comprise a first impregnation part 131*a* disposed on the first connection part 113*a* and connected to the uppermost side of the other side part 133, a second impregnation part 132*b* disposed on the second connection part 113*b* and connected to the lowermost side of the other side part 133, and a third impregnation part 133*c* disposed on the third connection part 113*c* and connected to a central side of the other side part 133.

The sealing part 114 may be formed between the main body 111 and the additional electrolyte accommodation part 112 except for the connection part 113.

Also, the sealing part 114 may comprise a first sealing part 114*a* and a second sealing part 114*b*. The first sealing part 114*a* may be provided between the first connection part 113*a* connecting the uppermost side and the third connection part 113*c* connecting the central side, and the second sealing part 114*b* may be provided between the second connection part 113*b* connecting the lowermost side and the third connection part 113*c* connecting the central side.

Furthermore, the sealing part 114 may be formed by thermally fusing the battery case 110.

The plurality of secondary batteries 100 according to the first embodiment of the present invention may be electrically connected to each other to form a battery pack.

Second Embodiment

Hereinafter, a secondary battery according to a second embodiment of the present invention will be described.

Figure 3:
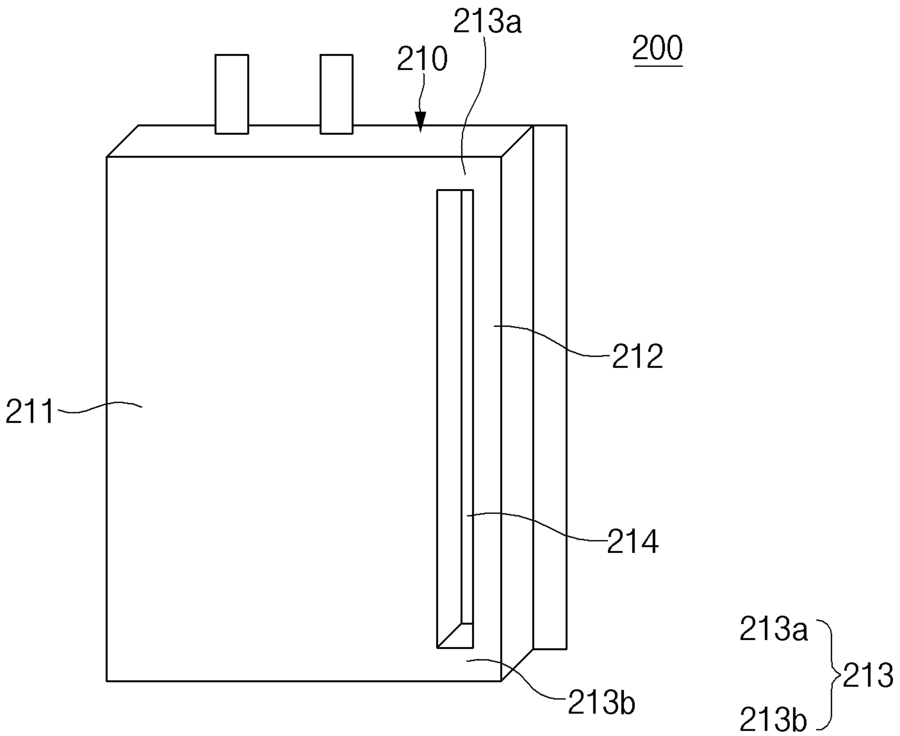
FIG. 3 is a perspective view of a secondary battery according to a second embodiment of the present invention.
Figure 4:
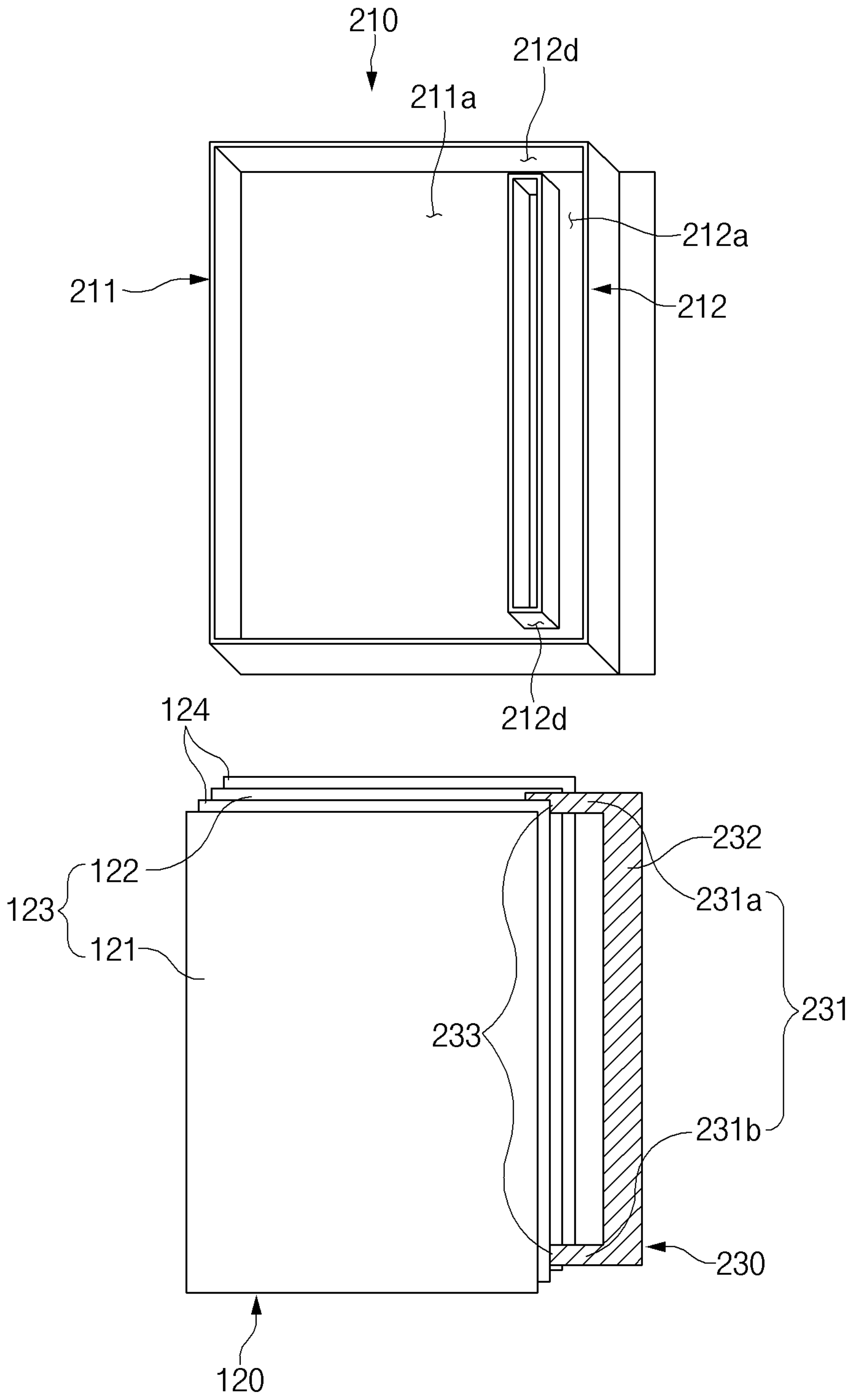
FIG. 4 is an exploded perspective view of the secondary battery of FIG. 3 with a removed portion.

FIG. 3 is a perspective view of a secondary battery according to a second embodiment of the present invention, and FIG. 4 is an exploded perspective view illustrating a state in which a portion of the secondary battery is removed according to the second embodiment of the present invention.

Referring to FIGS. 3 and 4, a secondary battery 200 according to a second embodiment of the present invention relates to a secondary battery 200 comprising an electrolyte and a battery case 210. The battery case 210 comprises a main body 211 in which the electrode assembly 120 and the electrolyte are accommodated, an additional electrolyte accommodation part 212 accommodating an additional electrolyte, a connection part 213 forming a moving passage 212*d* from the additional electrolyte accommodation part 212 to the main body 211, and an electrolyte impregnation member 230 provided in the connection part 213. In addition, the secondary battery 200 according to the second embodiment of the present invention may further comprise a sealing part 214.

The secondary battery 200 according to the second embodiment of the present invention is the same as the secondary battery according to the first embodiment of the present invention except for a shape of the connection part 213. Thus, in the second embodiment of the secondary battery 200, contents duplicated with the secondary battery according to the forgoing first embodiment of the present invention will be omitted or briefly described, and also, differences therebetween will be mainly described.

In more detail, the secondary battery 200 comprises the electrode assembly 120, the electrolyte, and the battery case 210 accommodating the electrode assembly 120 and the electrolyte.

The battery case 210 may comprise the main body 211, the additional electrolyte accommodation part 212, the connection part 213, and the electrolyte impregnation member 230.

An accommodation space 211*a* in which the electrode assembly 120 and the electrolyte are accommodated may be formed in the main body 211.

A storage space 212*a* accommodating the additional electrolyte may be formed in the additional electrolyte accommodation part 212. Here, the additional electrolyte accommodation part 212 may be formed in a rectangular cylindrical shape with a hollow therein.

Also, the additional electrolyte accommodation part 212 may have a length L1 that is same as a length L2 of the main body 211.

The connection part 213 may form the moving passage 213*d* through which the additional electrolyte is supplied from the additional electrolyte accommodation part 212 to the main body 211.

The connection part 213 may have the same thickness as each of the main body 211 and the additional electrolyte accommodation part 212.

The connection part 213 may connect upper and lower portions of the additional electrolyte accommodation part 212 to each other.

The connection part 213 may comprise a first connection part 213*a* connecting the main body 211 to the uppermost side of the additional electrolyte accommodation part 212 and a second connection part 113*b* connecting the main body 211 to the lowermost side of the additional electrolyte accommodation part 212.

Each of the first connection part 213*a* and the second connection part 213*b* may be formed in a rectangular cylindrical shape.

The electrolyte impregnation member 230 may be provided on the connection part 213 and may be impregnated with the additional electrolyte.

Thus, when an amount of electrolyte accommodated in the accommodation space 211*a* of the main body 211 is reduced, the electrolyte impregnation member 230 may induce the additional electrolyte disposed in the additional electrolyte accommodation part 212 so as to be supplied to the accommodation space 211*a* of the main body 211.

Also, one side part 232 of the electrolyte impregnation member 230 may further extend into the storage space 212*a* of the additional electrolyte accommodation part 212.

Also, the electrolyte solution impregnation member 230 may comprise at least one or more of a nonwoven fabric, a separation membrane 124, or a cloth. Here, the separation membrane used in the electrolyte impregnation member 230 may be made of the same material as the separator 224 used in the electrode assembly.

Also, the electrolyte impregnation member 230 may comprise an impregnation part 231 disposed on the connection part 213, one side part 232 that further extends into the storage space 212*a* of the additional electrolyte accommodation part 212, and the other side part 233 that further extends into the accommodation part of the main body 211.

Here, the other side part 233 of the electrolyte impregnation member 230 may have a size corresponding to a length and width of the accommodation space 211*a* of the additional electrolyte accommodation part 212. Here, the other side part 233 of the electrolyte impregnation member 230 may be formed in a rectangular plate shape having a predetermined width.

Furthermore, an end of the other side part 233 of the electrolyte impregnation member 230 may further extend into the accommodation space of the main body 211. Here, the end of the other side part 233 of the electrolyte impregnation member 230 may extend between the electrode 122 and the separator 124.

Also, the electrolyte impregnation member 230 may be formed in a "⊏" shape.

The impregnation part 231 may be formed to have a size corresponding to a length and width of the moving passage **213*d* of the connection part 213**.

Also, the impregnation part 231 may comprise a first impregnation part **231*a* disposed on the first connection part 213*a* and connected to the uppermost side of the other side part 233 and a second impregnation part 232*b* disposed on the second connection part 213*b* and connected to the lowermost side of the other side part 233**.

The sealing part 214 may be formed between the main body 211 and the additional electrolyte accommodation part 212 except for the connection part 213.

Third Embodiment

Hereinafter, a secondary battery according to a third embodiment of the present invention will be described.

Figure 5:
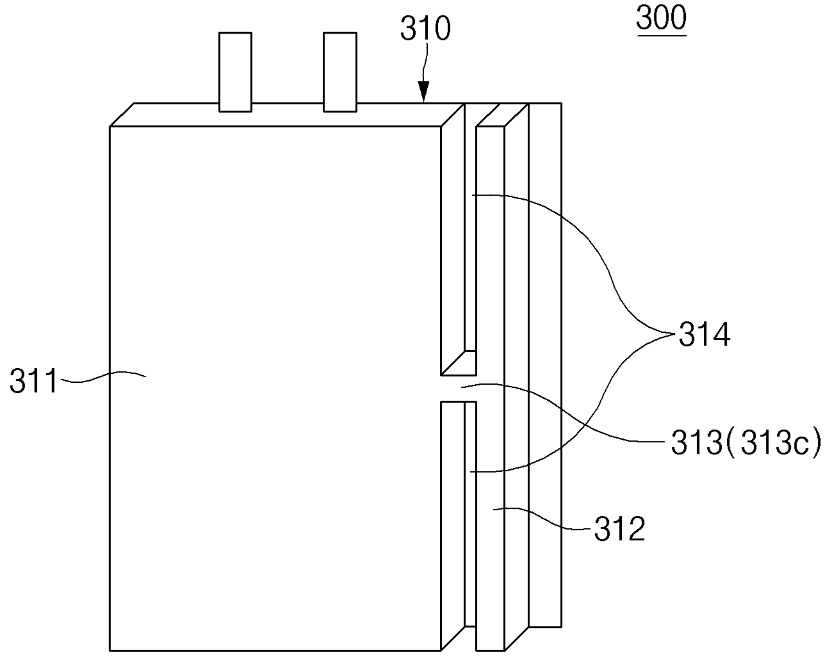
FIG. 5 is a perspective view of a secondary battery according to a third embodiment of the present invention.
Figure 6:
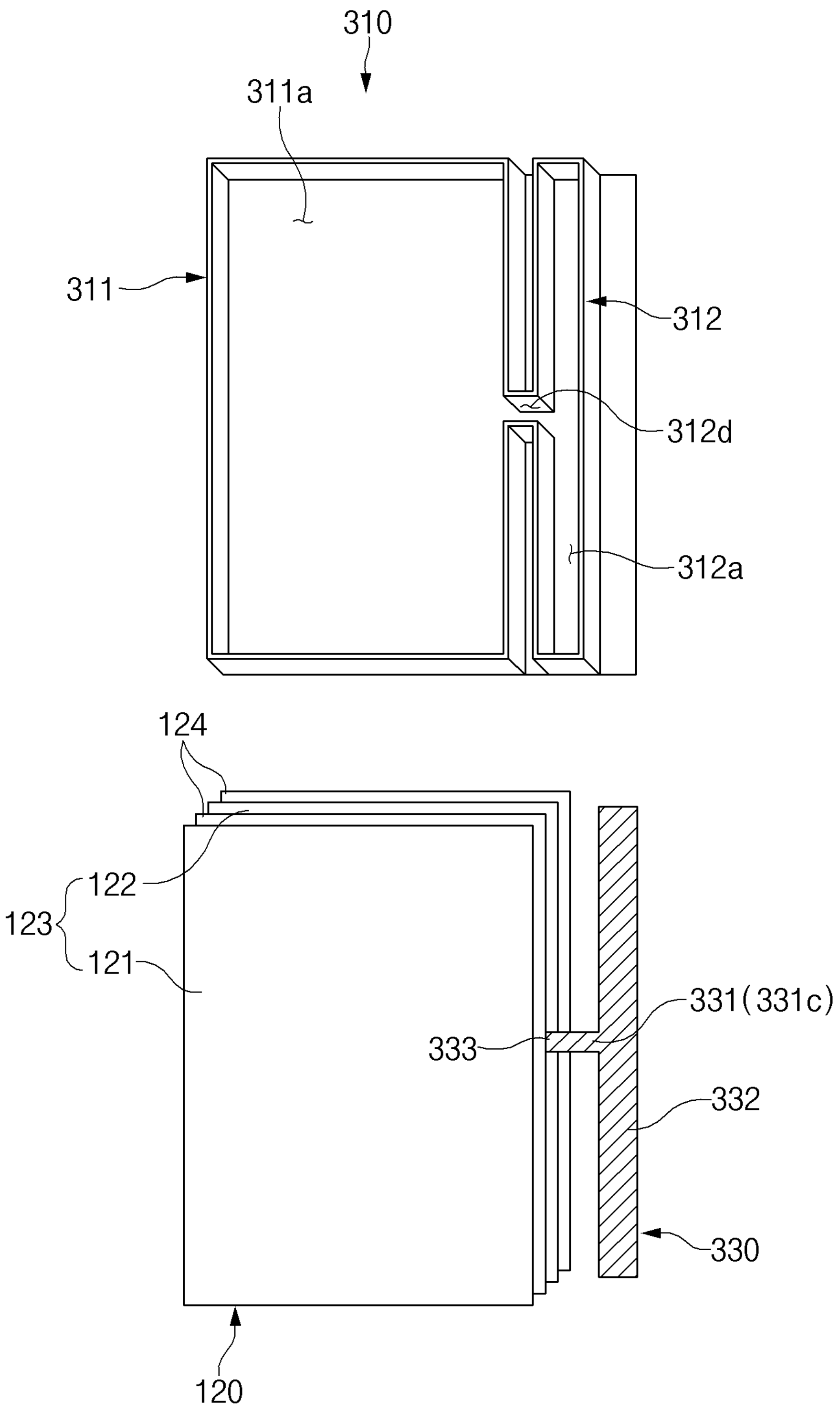
FIG. 6 is an exploded perspective view of the secondary battery of FIG. 5 with a removed portion.

FIG. 5 is a perspective view of a secondary battery according to a third embodiment of the present invention, and FIG. 6 is an exploded perspective view illustrating a state in which a portion of the secondary battery is removed according to the third embodiment of the present invention.

Referring to FIGS. 5 and 6, a secondary battery 300 according to a third embodiment of the present invention relates to a secondary battery 300 comprising an electrolyte and a battery case 310. The battery case 310 comprises a main body 311 in which the electrode assembly 120 and the electrolyte are accommodated, an additional electrolyte accommodation part 312 accommodating an additional electrolyte, a connection part 313 forming a moving passage **313*d* from the additional electrolyte accommodation part 312 to the main body 311, and an electrolyte impregnation member 330 provided in the connection part 313. In addition, the secondary battery 300 according to the third embodiment of the present invention may further comprise a sealing part 314**.

The secondary battery 400 according to the third embodiment of the present invention is the same as the secondary batteries according to the first and second embodiments of the present invention except for a shape of the connection part 313. Thus, in the third embodiment of the secondary battery 300, contents duplicated with the secondary batteries according to the forgoing embodiments of the present invention will be omitted or briefly described, and also, differences therebetween will be mainly described.

In more detail, the secondary battery 300 comprises the electrode assembly 120, the electrolyte, and the battery case 310 accommodating the electrode assembly 120 and the electrolyte.

The battery case 310 may comprise the main body 311, the additional electrolyte accommodation part 312, the connection part 313, and the electrolyte impregnation member 330.

An accommodation space **311*a* in which the electrode assembly 120 and the electrolyte are accommodated may be formed in the main body 311**.

A storage space **312*a* accommodating the additional electrolyte may be formed in the additional electrolyte accommodation part 312. Here, the additional electrolyte accommodation part 312** may be formed in a rectangular cylindrical shape with a hollow therein.

The additional electrolyte accommodation part 312 may have the same length as the main body 311.

The connection part 313 may form the moving passage **313*d* through which the additional electrolyte is supplied from the additional electrolyte accommodation part 312 to the main body 311**.

Also, the connection part 313 may have the same thickness as each of the main body 311 and the additional electrolyte accommodation part 312.

Furthermore, the connection part 313 may connect a central portion of the additional electrolyte accommodation part 312 to each other.

Here, the connection part 313 may comprise a third connection part **313*c* connecting the main body 311 to a central side of the additional electrolyte accommodation part 312**.

Here, the third connection part **313*c*** may be formed in a rectangular cylindrical shape.

The electrolyte impregnation member 330 may be provided on the connection part 313 and may be impregnated with the additional electrolyte.

Thus, when an amount of electrolyte accommodated in the accommodation space **311*a* of the main body 311 is reduced, the electrolyte impregnation member 330 may induce the additional electrolyte disposed in the additional electrolyte accommodation part 312 so as to be supplied to the accommodation space 311*a* of the main body 311**.

Also, one side part 332 of the electrolyte impregnation member 330 may further extend into the storage space **312*a* of the additional electrolyte accommodation part 312**.

Also, the electrolyte impregnation member 330 may comprise at least one or more of a nonwoven fabric, a separation membrane, or a cloth. Here, the separation membrane used in the electrolyte impregnation member 330 may be made of the same material as the separator 224 used in the electrode assembly 120.

The electrolyte impregnation member 330 may comprise an impregnation part 331 disposed on the connection part 313, one side part 332 that further extends into the storage space **312*a* of the additional electrolyte accommodation part 312, and the other side part 333 that further extends into the accommodation part main body 311**.

Here, the other side part 333 of the electrolyte impregnation member 330 may have a size corresponding to a length and width of the accommodation space **311*a* of the additional electrolyte accommodation part 312. Here, the other side part 333 of the electrolyte impregnation member 330** may be formed in a rectangular plate shape having a predetermined width.

Furthermore, an end of the other side part 333 of the electrolyte impregnation member 330 may further extend into the accommodation space of the main body 311. Here, the end of the other side part 333 of the electrolyte impregnation member 330 may extend between the electrode 122 and the separator 124.

Also, the electrolyte impregnation member 330 may be formed in a "⊣" shape.

The impregnation part 331 may be formed to have a size corresponding to a length and width of the moving passage **313*d* of the connection part 313**.

Also, the impregnation part 331 may comprise a third impregnation part 331*c* disposed on the third connection part 313*c* and connected to a center side of the other side part 333.

The sealing part 314 may be formed between the main body 311 and the additional electrolyte accommodation part 312 except for the connection part 313.

Manufacturing Example 1

Manufacture of Negative Electrode

92% by weight of a negative electrode active material (graphite: Sio=7:3), 3% by weight of Denka black (conductive agent), 3.5% by weight of SBR (binder), and 1.5% by weight of CMC (thickening agent) were added to water to prepare negative electrode mixture slurry.

The prepared negative electrode mixture slurry was applied on both surfaces of a copper collector, and then, dried and rolled to prepare a negative electrode.

Manufacture of Positive Electrode 97.5% by weight of LiNi0.8Co0.1Mn0.1O2 as a positive electrode active material, 1% by weight of Denka black (conductive agent), and 1.5% by weight of PVdF (binder) were added to NMP to prepare positive electrode mixture slurry.

The prepared positive electrode mixture slurry was applied on both surfaces of an aluminum collector, and then, dried and rolled to prepare a positive electrode.

Assembly of Secondary Battery

An electrode assembly in which the prepared positive electrode and negative electrode are stacked with a separator (poly propylene) therebetween was put into a battery case, and 2 wt % of fluoroethylene carbonate (FEC) was added to a solvent in which ethylene carbonate (EC) and ethyl methyl carbonate (EMC) are mixed at a volume of 3:7. Then, 4 ml of an electrolyte in which 1M of LiPF6 is dissolved was injected, and the battery case was sealed to manufacture the secondary battery.

Here, the secondary battery was manufactured in the same configuration as the secondary battery according to the first embodiment of the present invention, which is illustrated in FIG. 1.

That is, a secondary battery comprising a main body accommodating the electrode assembly and the electrolyte, an additional electrolyte accommodation part having a storage space in which an additional electrolyte is accommodated, a connection part connecting a moving passage, through which the additional electrolyte is supplied from the additional electrolyte accommodation part to the main body, to the uppermost side, the lowermost side, and a central side, and an electrolyte impregnation member provided on the connection part and impregnated with the additional electrolyte. At this time, a sealing part was formed between the main body and the additional electrolyte accommodation part except for the connection part. Here, the additional electrolyte was the same component as the electrolyte, and the electrolyte disposed in the additional electrolyte accommodation part was defined as the additional electrolyte.

Manufacturing Example 2

In Manufacturing Example 2, a secondary battery was manufactured in the same manner as in Manufacturing Example 1, except for a shape of a battery case, which is different from that of the battery case according to Manufacturing Example 1.

Here, the secondary battery was manufactured in the same configuration as the secondary battery according to the second embodiment of the present invention, which is illustrated in FIG. 3.

That is, a secondary battery comprising a main body accommodating the electrode assembly and the electrolyte, an additional electrolyte accommodation part having a storage space in which an additional electrolyte is accommodated, a connection part connecting a moving passage, through which the additional electrolyte is supplied from the additional electrolyte accommodation part to the main body, to the uppermost side and the lowermost side, and an electrolyte impregnation member provided on the connection part and impregnated with the additional electrolyte. At this time, a sealing part was formed between the main body and the additional electrolyte accommodation part except for the connection part.

Manufacturing Example 3

In Manufacturing Example 3, a secondary battery was manufactured in the same manner as in Manufacturing Example 1, except for a shape of a battery case, which is different from that of the battery case according to Manufacturing Example 1.

Here, the secondary battery was manufactured in the same configuration as the secondary battery according to the third embodiment of the present invention, which is illustrated in FIG. 5.

That is, a secondary battery comprising a main body accommodating the electrode assembly and the electrolyte, an additional electrolyte accommodation part having a storage space in which an additional electrolyte is accommodated, a connection part connecting a moving passage, through which the additional electrolyte is supplied from the additional electrolyte accommodation part to the main body, to a central side, and an electrolyte impregnation member provided on the connection part and impregnated with the additional electrolyte. At this time, a sealing part was formed between the main body and the additional electrolyte accommodation part except for the connection part.

Comparative Example 1

Figure 7:
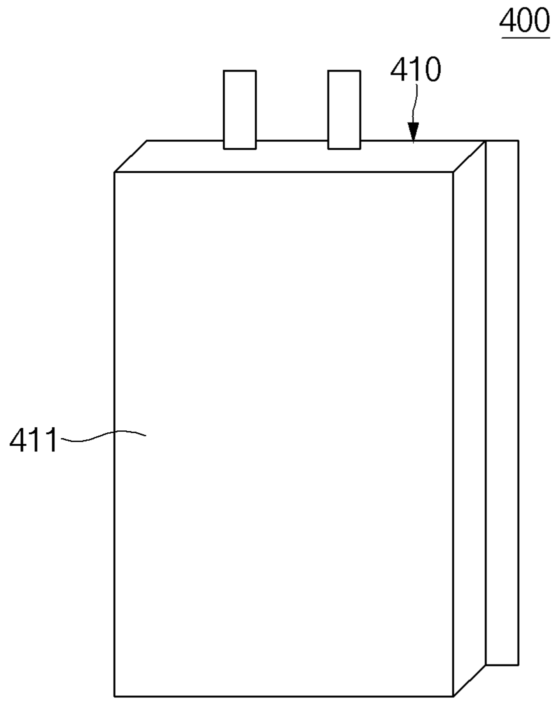
FIG. 7 is a perspective view of a secondary battery according to a Comparative Example 1.

FIG. 7 is a perspective view of a secondary battery according to Comparative Example 1.

Referring to FIG. 7, in Comparative Example 1, a secondary battery was manufactured in the same manner as in Manufacturing Example 1, except that the additional electrolyte accommodation part, the connection part, and the sealing part are not formed in the battery case according to Manufacturing Example 1.

That is, a secondary battery 400 was manufactured by forming only a main body 411 accommodating an electrode assembly and an electrolyte in a battery case 410.

Comparative Example 2

Figure 8:
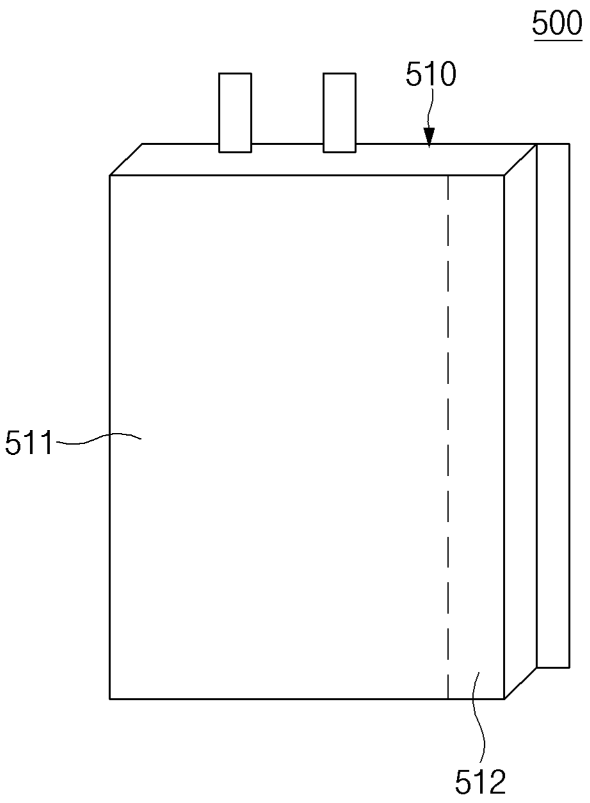
FIG. 8 is a perspective view of a secondary battery according to a Comparative Example 2.

FIG. 8 is a perspective view of a secondary battery according to Comparative Example 2.

Referring to FIG. 8, in Comparative Example 2, a secondary battery was manufactured in the same manner as in Manufacturing Example 1, except that the connection part and the sealing part are not formed in the battery case according to Manufacturing Example 1.

That is, a secondary battery 500 comprising a main body 511 accommodating an electrode assembly and an electrolyte and an additional electrolyte accommodation part 512 in a battery case 510 was manufactured. Here, the main body 511 and the additional electrolyte accommodation part 512 were manufactured in a form in which an additional space is further formed in a side surface of the main body without being connected to each other by a connection part.

Experimental Example

The secondary batteries prepared in Manufacturing Examples 1 to 3 and Comparative Examples 1 and 2 were subjected to a charge/discharge reversibility test using an electrochemical charging/discharging device. During charging, current was applied to a voltage of 4.2 V (vs. Li/LI+) at a current density of 0.1 C-rate, and during discharging, the discharge was performed to a voltage of 2.5 V at the same current density. Table 1 shows a 300 cycle capacity retention rate compared to a first cycle discharge capacity.

TABLE 1

| | Manufacturing Example 1 | Manufacturing Example 2 | Manufacturing Example 3 | Comparative Example 1 | Comparative Example 2 |
|---|---|---|---|---|---|
| 300 cycle capacity retention rate (%) | 76 | 74 | 73 | 43 | 62 |

Referring to Table 1, in the case of Manufacturing Examples 1 to 3, since there is a surplus electrolyte in the additional electrolyte space, cycle deterioration due to depletion of the electrolyte is not severe, and thus, the 300 cycle capacity retention rate was high. On the other hand, in the case of Comparative Example 1, which relates to the general secondary battery structure, it is seen that since there is no surplus electrolyte, the 300 cycle capacity retention rate decreases by about 20% to about 23% due to the depletion of the electrolyte. In the case of Comparative Example 2, it is seen that although the additional electrolyte space is formed, and the surplus electrolyte is put in the additional electrolyte space, the connection part in which the electrolyte impregnation member is disposed is not provided between the electrode part and the additional electrolyte space, and thus, the electrolyte is not induced, and also, the sealing part is not provided to deteriorate electrode compression force due to the battery case, and thus, the charging/discharging of the electrode is not performed well during the charging/discharging, and as a result, the 300 cycle capacity retention rate decreases by about 11% to about 40%. As a result, it is seen that since the capacity retention rate in Manufacturing Examples 1 to 3 is significantly higher than that in Comparative Examples 1 and 2, the battery capacity has been improved.

While the present invention has been particularly shown and described with reference to exemplary embodiments thereof, it is to be understood that the scope of the present invention is not limited to the secondary battery according to the present invention. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

100: Secondary battery
110, 210, 310: Battery case
111, 211, 311: Main body
111*a*: Accommodation space
112, 212, 312: Additional electrolyte accommodation part
112*a*: Storage space
113, 213, 313: Connection part
113*a*, 213*a*: First connection part
113*b*, 212*b*: Second connection part
113*c*, 313*c*: Third connection part
114, 214, 314: Sealing part
114*a*: First sealing part
114*b*: Second sealing part
120: Electrode assembly
121: Positive electrode
122: Negative electrode
123: Electrode
124: Separator
130, 230, 330: Electrolyte impregnation member
131, 231, 331: Impregnation part
132, 232, 332: One side part
133, 233, 333: The other side part

The invention claimed is:

1. A secondary battery comprising:
an electrode assembly,
an electrolyte, and
a battery case to accommodate the electrode assembly and the electrolyte,
wherein the battery case comprises:
a main body having an accommodation space, the electrode assembly and the electrolyte being accommodated within the accommodation space;
an additional electrolyte accommodation part having a storage space, an additional electrolyte accommodated within the storage space;
a connection part configured to form a moving passage through which the additional electrolyte is supplied from the additional electrolyte accommodation part to the main body; and
an electrolyte impregnation member provided in the connection part and impregnated with the additional electrolyte, wherein the electrolyte impregnation member extending from the storage space of the additional electrolyte accommodation part through the moving passage of the connection part to the accommodation space of the main body, wherein a first side part of the electrolyte impregnation member extends into the storage space, wherein a second side part of the electrolyte impregnation member extends into the accommodation space, wherein the electrode assembly comprises alternately stacked electrodes and a separator therebetween, the second side part extending between the electrodes and the separator.

2. The secondary battery of claim 1, wherein the electrolyte impregnation member induces the additional electrolyte to be supplied into the accommodation space when an amount of electrolyte in the accommodation space decreases.

3. The secondary battery of claim 1, wherein the connection part connects the main body to upper and lower portions or a central portion of the additional electrolyte accommodation part.

4. The secondary battery of claim 1, wherein the connection part connects the main body to upper and lower portions and a central portion of the additional electrolyte accommodation part.

5. The secondary battery of claim 4, wherein the connection part comprises:

a first connection part configured to connect the main body to an uppermost side of the additional electrolyte accommodation part;

a second connection part configured to connect the main body to a lowermost side of the additional electrolyte accommodation part; and a third connection part configured to connect the main body to a central side of the additional electrolyte accommodation part.

6. The secondary battery of claim 5, wherein the electrolyte impregnation member comprises:

an impregnation part disposed in the connection part;

a first side part extending into the storage space; and a second side part extending into the accommodation space, wherein the first side part having a size corresponding to a length and width of the storage space, and the impregnation part having a size corresponding to a length and width of the moving passage.

7. The secondary battery of claim 6, wherein the second side part has a rectangular plate shape with a predetermined width, and the impregnation part comprises:

a first impregnation part disposed in the first connection part and connected to the uppermost side of the second side part;

a second impregnation part disposed in the second connection part and connected to the lowermost side of the second side part; and a third impregnation part disposed on the third connection part and connected to the central side of the second side part.

8. The secondary battery of claim 1, wherein a length of the additional electrolyte accommodation part is the same as a length of the main body.

9. The secondary battery of claim 1, further comprising a sealing part extending between the main body and the additional electrolyte accommodation part except at the connection part.

10. The secondary battery of claim 1, wherein a thickness of the connection part is the same as a thickness as each of the main body and the additional electrolyte accommodation part.

11. A battery pack comprising the secondary battery of claim 1.

* * * * *